United States Patent
Takagi

(10) Patent No.: US 6,937,600 B2
(45) Date of Patent: Aug. 30, 2005

(54) COMMUNICATION DEVICE AND COMMUNICATION CONTROL METHOD USING LOWER LAYER DATA TRANSMISSION ORDER CONTROL AT UPPER LAYER

(75) Inventor: Masahiro Takagi, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 842 days.

(21) Appl. No.: 09/838,145

(22) Filed: Apr. 20, 2001

(65) Prior Publication Data

US 2001/0036154 A1 Nov. 1, 2001

(30) Foreign Application Priority Data

Apr. 21, 2000 (JP) ........................................ 2000-121631

(51) Int. Cl.[7] ............................................... H04L 12/56
(52) U.S. Cl. ........................ 370/394; 370/469; 370/412
(58) Field of Search ................................ 370/229, 230, 370/389, 395.3, 412, 428, 469, 328, 310, 394, 338, 468

(56) References Cited

U.S. PATENT DOCUMENTS

| | | | | |
|---|---|---|---|---|
| 5,912,878 A | * | 6/1999 | Park et al. ................... | 370/229 |
| 6,034,962 A | * | 3/2000 | Ohno et al. .................. | 370/399 |
| 6,078,564 A | * | 6/2000 | Lakshman et al. ........... | 370/235 |
| 6,104,700 A | * | 8/2000 | Haddock et al. ............. | 370/235 |
| 6,215,769 B1 | * | 4/2001 | Ghani et al. ................. | 370/230 |
| 6,535,515 B1 | * | 3/2003 | Hasegawa et al. ...... | 370/395.52 |
| 6,862,283 B2 | * | 3/2005 | Marietta et al. ............. | 370/394 |

OTHER PUBLICATIONS

Antonio Desimone, et al. "Throughput Performance of Transport–Layer Protocols over Wireless LANs" Globecom 1993 IEEE, pp. 542–549.

David A. Eckhardt, et al. "Improving Wireless LAN Performance via Adaptive Local Error Control" Int. Conf. Network Protocols, 1998.

* cited by examiner

Primary Examiner—Chau Nguyen
Assistant Examiner—Joshua Kading
(74) Attorney, Agent, or Firm—Oblon, Spivak, McClelland, Maier & Neustadt, P.C.

(57) ABSTRACT

In a communication device using a communication protocol with data loss compensation functions provided at both an upper layer and a lower layer, a transmission order among packets to be transmitted is controlled at the lower layer, according to the transmission states of upper layer connections to which the packets belong, such that when there is at least one non-transmitted packet for each one of at least two different upper layer connections, at least two packets to be transmitted consecutively are belonging to different upper layer connections.

15 Claims, 12 Drawing Sheets

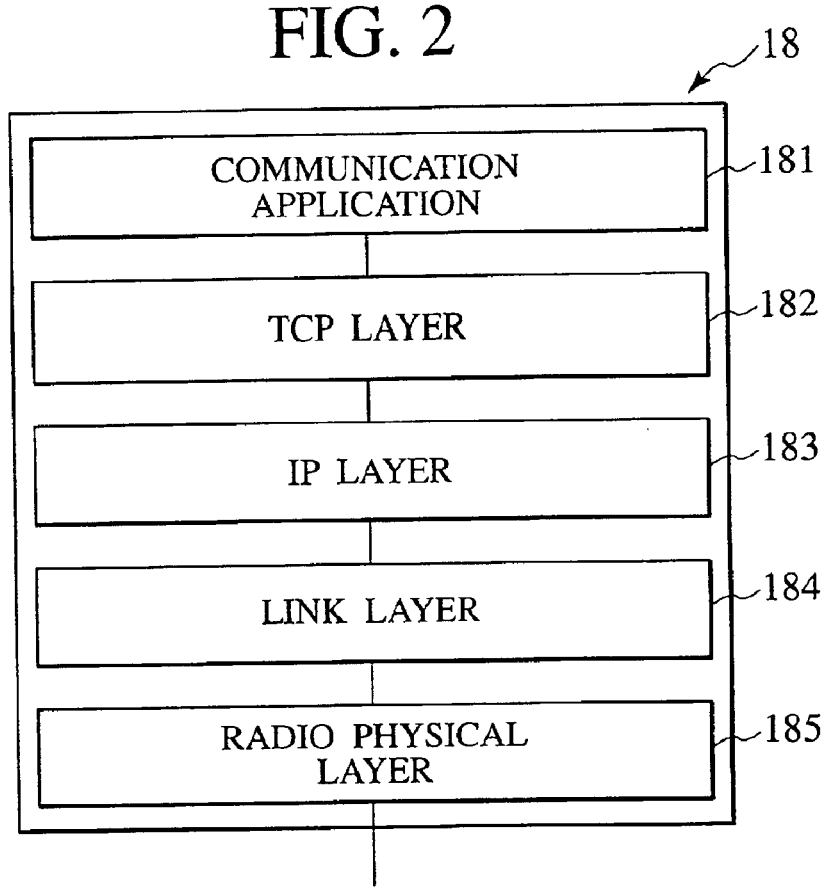
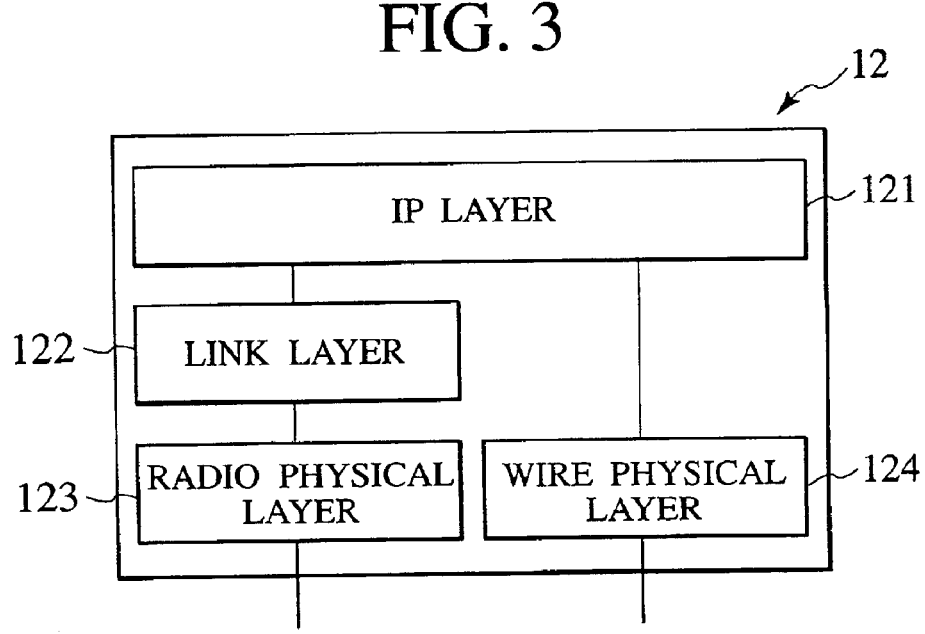

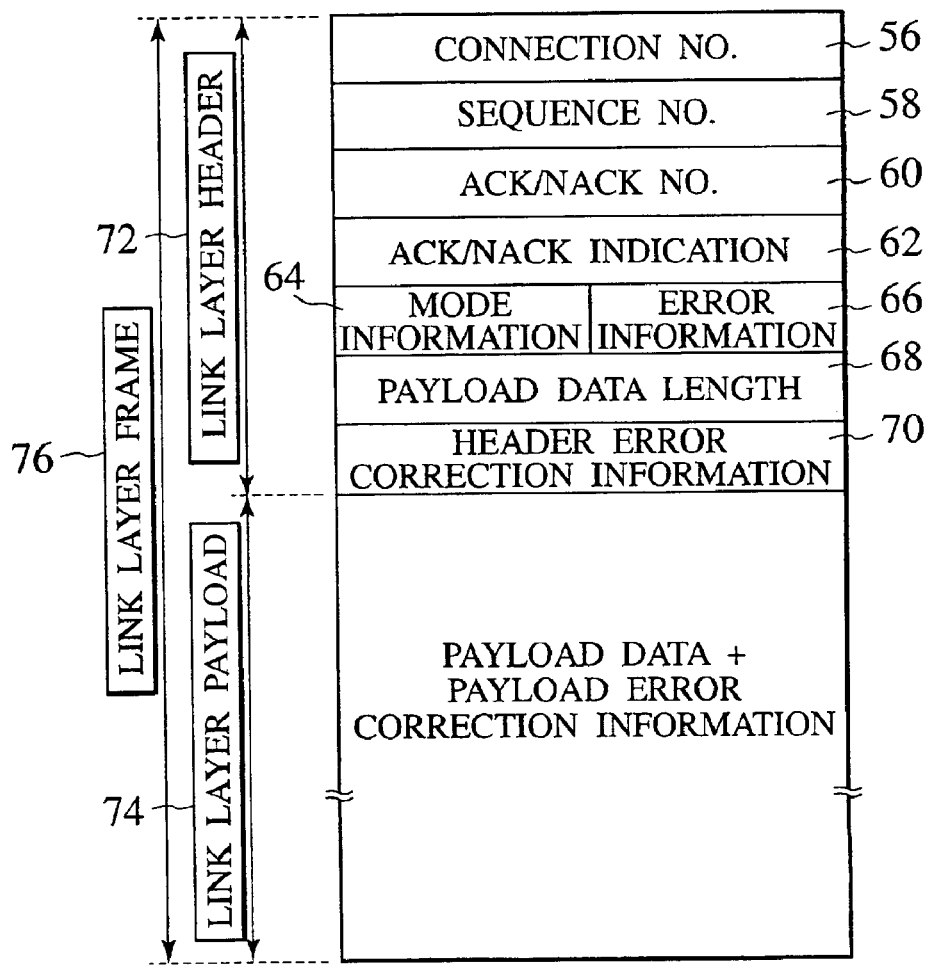

FIG. 12

TCP TRANSMISSION
MANAGEMENT TABLE (2)

| TCP CONNECTION | TRANSMITTED BEFORE |
|---|---|
| #1 | YES |
| #2 | YES |
| ≈ | ≈ |
| #X | NO |

FIG. 13

TCP TRANSMISSION
MANAGEMENT TABLE (3)

| TCP CONNECTION | TRANSMITTED BEFORE |
|---|---|
| #1 | NO |
| #2 | NO |
| ≈ | ≈ |
| #X | NO |

COMMUNICATION DEVICE AND COMMUNICATION CONTROL METHOD USING LOWER LAYER DATA TRANSMISSION ORDER CONTROL AT UPPER LAYER

BACKGROUND OF THE INVENTION

1. Field of the Invention

The present invention relates to a communication device and a communication control method using a communication protocol with data loss compensation functions provided at both upper and lower layers.

2. Description of the Related Art

In the case of transmitting data through unstable channels such as radio transmission paths in which errors can occur at a high probability, it is customary to provide functions for data re-transmission, error correction, etc., on a link layer protocol for the purpose of compensating the data loss due to channel errors.

At the link layer adopting the data loss compensation function, when data are re-transmitted for the purpose of compensating the data loss, the data transmission delay will be increased considerably during that time. The data transmission delay is also affected by the change of the redundancy for the purpose of the error correction used at the link layer. For these reasons, when the TCP/IP (Transmission Control Protocol/Internet Protocol) with the data loss compensation function is used as an upper layer protocol, for example, it is known that there is a possibility for a time-out re-transmission of the TCP to occur due to a variation of the transmission delay caused at the link layer. On the other hand, most of the data loss can be compensated at the link layer so that the re-transmission by the TCP is actually unnecessary in many cases, and the re-transmission may cause wasteful consumption of the channel capacity.

The above noted phenomenon becomes prominent in the case where a plurality of TCP connections having relative close RTT (Round Trip Time) values are sharing the same channel having the data loss compensation function. This is the case of utilizing a WWW (World Wide Web) browser such as NETSCAPE NAVIGATOR (registered trademark) or INTERNET EXPLORER (registered trademark) in which a plurality of TCP connections are set up simultaneously in general, for example. The TCP carries out the flow control by changing a window size, and when a TCP transmission terminal receives ACK (Acknowledgement), this terminal immediately transmits packets that have become transmittable upon receiving this ACK. As a result, there is little possibility for a transmission of other packets to interrupt the continuous transmission of packets of a specific TCP connection. Consequently, there is a tendency for packets of the same TCP connection to be transmitted in lumps.

For example, when a frame of the link layer containing packet data of a given TCP connection (which will be referred to as TCP connection A) is lost due to channel errors, the link layer protocol re-transmits the data by raising the error correction redundancy such as FEC (Forward Error Correction). For this reason, the transmission delay is increased considerably during that time.

In addition, when the subsequent frames are also transmitted with the same error correction redundancy until the channel state recovers, the effective bandwidth of the channel will be reduced so that the transmission delay will be increased further. The TCP transmission terminal can receive ACK of the TCP connection A relatively quickly so that it is highly likely for this terminal to be able to deal with this situation without causing the time-out to occur by gradually increasing the time-out value of the TCP connection A.

However, as the channel is occupied for a relatively long period of time by the TCP connection A, the TCP transmission terminal cannot receive ACK from any TCP connections other than the TCP connection A during this period of time. For this reason, it becomes likely for the time-out re-transmission to occur for these other TCP connections.

This situation becomes even more prominent when the following burst error condition is satisfied in addition. Note that the above described link layer protocol that increases the error correction redundancy at a time of the occurrence of an error is designed to deal with the following burst error condition.

In the case of a channel such as radio channel in which bursty errors occur, the wasteful time-out re-transmission by the TCP can occur more easily. Namely, in the case of bursty errors, the transmission delay is small during a relatively long period of time in which no error occurs, so that the time-out value of the TCP that is adaptively set up according to the RTT observed by the TCP transmission terminal remains at small values and it gradually becomes a state in which the time-out can occur more easily. Then, when the bursty errors occur, the transmission delay becomes large abruptly so that the adaptive control of the time-out value of the TCP cannot keep up with the change and the possibility for the time-out re-transmission to occur becomes high.

BRIEF SUMMARY OF THE INVENTION

It is therefore an object of the present invention to provide a communication device and a communication control method for the case of carrying out communications using a communication protocol with data loss compensation functions provided at both upper and lower layers, which are capable of suppressing the wasteful execution of the data loss compensation function at the upper layer even when the transmission delay is increased by the data loss compensation function at the lower layer.

According to one aspect of the present invention there is provided a communication device using a communication protocol with data loss compensation functions provided at both an upper layer and a lower layer, comprising: a packet storage unit configured to store a plurality of packets to be transmitted to another communication device; a connection identification unit configured to identify an upper layer connection to which each packet stored by the packet storage unit belongs; a transmission state management unit configured to manage a transmission state of each upper layer connection identified by the connection identification unit; a packet transmission unit configured to transmit each packet stored by the packet storage unit; and a packet transmission order control unit configured to control a transmission order among the plurality of packets to be transmitted by the packet transmission unit at the lower layer, according to the transmission state managed by the transmission state management unit, such that when the packet storage unit stores at least one non-transmitted packet for each one of at least two different upper layer connections, at least two packets to be transmitted by the packet transmission unit consecutively are belonging to different upper layer connections.

According to another aspect of the present invention there is provided a communication control method for controlling a communication device using a communication protocol with data loss compensation functions provided at both an upper layer and a lower layer, the method comprising: storing a plurality of packets to be transmitted to another communication device; identifying an upper layer connection to which each packet stored by the storing step belongs; managing a transmission state of each upper layer connection identified by the identifying step; transmitting each packet stored by the storing step; and controlling a transmission order among the plurality of packets to be transmitted by the transmitting step at the lower layer, according to the transmission state managed by the managing step, such that when the storing step stores at least one non-transmitted packet for each one of at least two different upper layer connections, at least two packets to be transmitted by the transmitting step consecutively are belonging to different upper layer connections.

According to another aspect of the present invention there is provided a computer usable medium having computer readable program codes embodied therein for causing a computer to function as a communication device using a communication protocol with data loss compensation functions provided at both an upper layer and a lower layer, the computer readable program codes include: a first computer readable program code for causing said computer to store a plurality of packets to be transmitted to another communication device; a second computer readable program code for causing said computer to identify an upper layer connection to which each packet stored by the first computer readable program code belongs; a third computer readable program code for causing said computer to manage a transmission state of each upper layer connection identified by the second computer readable program code; a fourth computer readable program code for causing said computer to transmit each packet stored by the first computer readable program code; and a fifth computer readable program code for causing said computer to control a transmission order among the plurality of packets to be transmitted by the fourth computer readable program code at the lower layer, according to the transmission state managed by the third computer readable program code, such that when the first computer readable program code stores at least one non-transmitted packet for each one of at least two different upper layer connections, at least two packets to be transmitted by the fourth computer readable program code consecutively are belonging to different upper layer connections.

According to another aspect of the present invention there is provided a communication device using a communication protocol with data loss compensation functions provided at both an upper layer and a lower layer, comprising: a packet storage unit configured to store a plurality of packets to be transmitted to another communication device; a connection identification unit configured to identify an upper layer connection to which each packet stored by the packet storage unit belongs; a transmission state management unit configured to manage a transmission state of each upper layer connection identified by the connection identification unit; a packet transmission unit configured to transmit each packet stored by the packet storage unit; and a packet transmission order control unit configured to control a transmission order of the plurality of packets stored in the packet storage unit, at the lower layer, according to the transmission state managed by the transmission state management unit, such that a level of continuity of packets belonging to each upper layer connection in the transmission order becomes not higher than a level of continuity of packets belonging to each upper layer connection in a storing order by which the plurality of packets are stored in the packet storage unit.

Other features and advantages of the present invention will become apparent from the following description taken in conjunction with the accompanying drawings.

BRIEF DESCRIPTION OF THE DRAWINGS

FIG. 2 is a block diagram showing a configuration of a communication protocol used in a radio terminal in the network system of FIG. 1.

FIG. 3 is a block diagram showing a configuration of a communication protocol used in a radio base station in the network system of FIG. 1.

FIG. 9 is a diagram showing one exemplary content of a TCP transmission management table used in the network system of FIG. 1.

FIG. 10 is a diagram showing a frame structure of a link layer in the the communication protocols of FIG. 2 and FIG. 3.

FIG. 12 is a diagram showing another exemplary content of a TCP transmission management table used in the network system of FIG. 1.

FIG. 13 is a diagram showing another exemplary content of a TCP transmission management table used in the network system of FIG. 1.

DETAILED DESCRIPTION OF THE INVENTION

Figure 1:
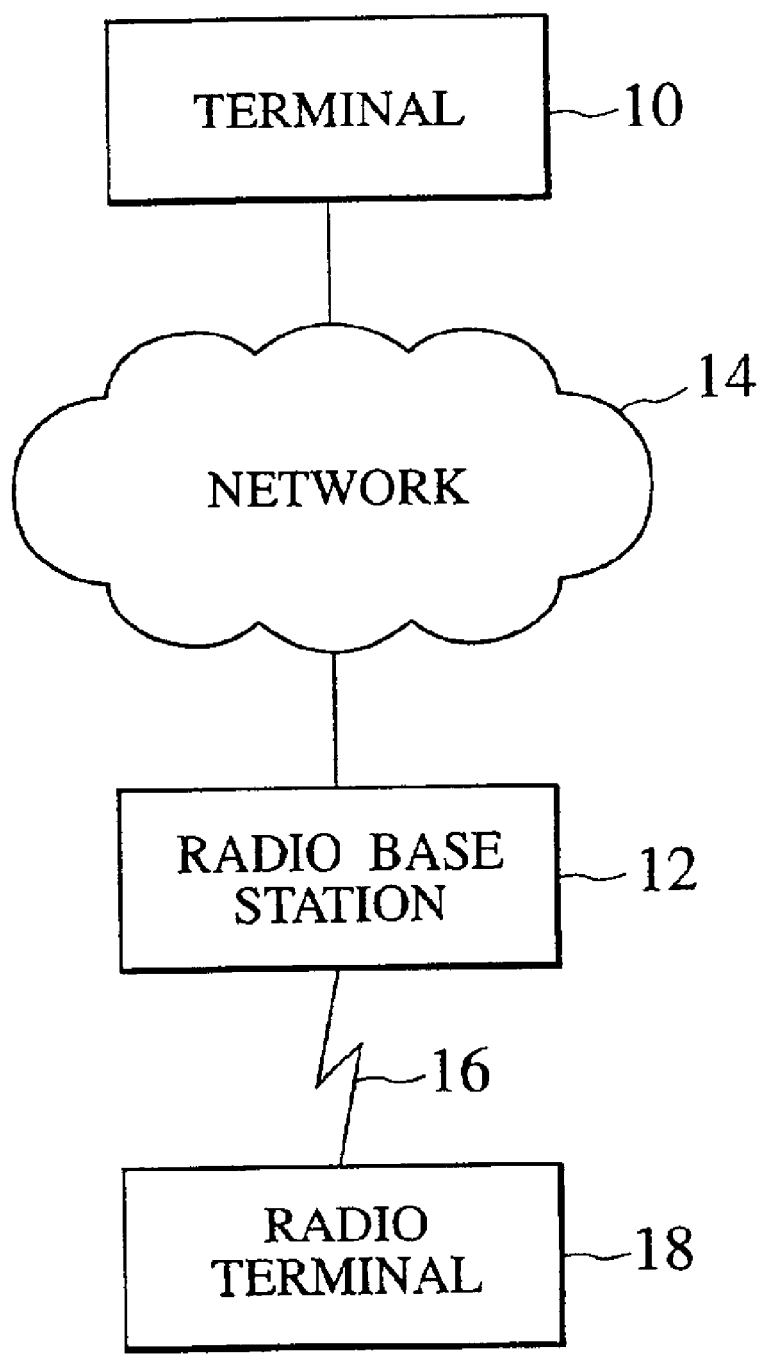
FIG. 1 is a schematic block diagram showing one exemplary configuration of a network system using a communication device according to the first embodiment of the present invention.

Referring now to FIG. 1 to FIG. 16, the first embodiment of a communication device and a communication control method according to the present invention will be described in detail. In the following description, the same or similar parts will be given the same or similar reference numerals in the drawings.

FIG. 1 shows an exemplary configuration of a network system according to the first embodiment of the present invention.

In the network system of FIG. 1, a terminal 10 and a radio base station 12 are connected through a network 14 having an IP packet delivery function. The radio base station 12 accommodates a radio terminal 18 using a radio channel 16. The terminal 10 and the radio terminal 18 can exchange IP packets through the network 14, the radio base station 12 and the radio channel 16. In the following, the exemplary case of the data transmission by the TCP from the terminal 10 to the radio terminal 18 will be described.

FIG. 2 shows a protocol configuration of the radio terminal 18 of FIG. 1 related to communication functions. The radio terminal 18 has a communication application 181, a TCP layer 182, an IP layer 183, a link layer 184 and a radio physical layer 185.

FIG. 3 shows a protocol configuration of the radio base station 12 of FIG. 1 related to communication functions. The radio base station 12 has an IP layer 121, a link layer 122, a radio physical layer 123 and a wire physical layer 124. The IP layer 121 contains an IP packet routing function. Here, the link layer 122 corresponding to the radio physical layer 123 is provided but there is no link layer corresponding to the wire physical layer 124. This implies that the wire side, i.e., the network 14 side has no source for varying the transmission delay depending on the channel state such as the re-transmission or the adaptive error correction according to the link state. Of course, in general, the link layer may be also provided on the wire side.

The link layer 184 of the radio terminal 18 of FIG. 2 and the link layer 122 of the radio base station 12 of FIG. 3 carry out transmission/reception of data through the radio channel 16 with respect to each other. Then, a function for compensating the data loss mainly due to radio errors that occur in the radio channel 16 by using the error correction, the re-transmission, etc., is realized.

Also, in the first embodiment of the present invention, it is assumed that all the TCP/IP packets are multiplexed into one link layer connection between the link layer 184 of FIG. 2 and the link layer 122 of FIG. 3. In other words, the set up or release of the link layer connection can be made independently from the set up or release of the TCP connection, and normally the link layer connection is set up when the radio terminal 18 starts communications with the radio base station 12 and released when the communications are terminated. In this embodiment, there is a need to identify the TCP connection at the link layer but there is no increase of the overhead such as the signaling (connection set up control) information for the purpose of the link layer connection set up. Packets of the other types such as those of UDP/IP (User Datagram Protocol/Internet protocol) may be multiplexed into this link layer connection or transmitted by using another link layer connection.

Figure 4:
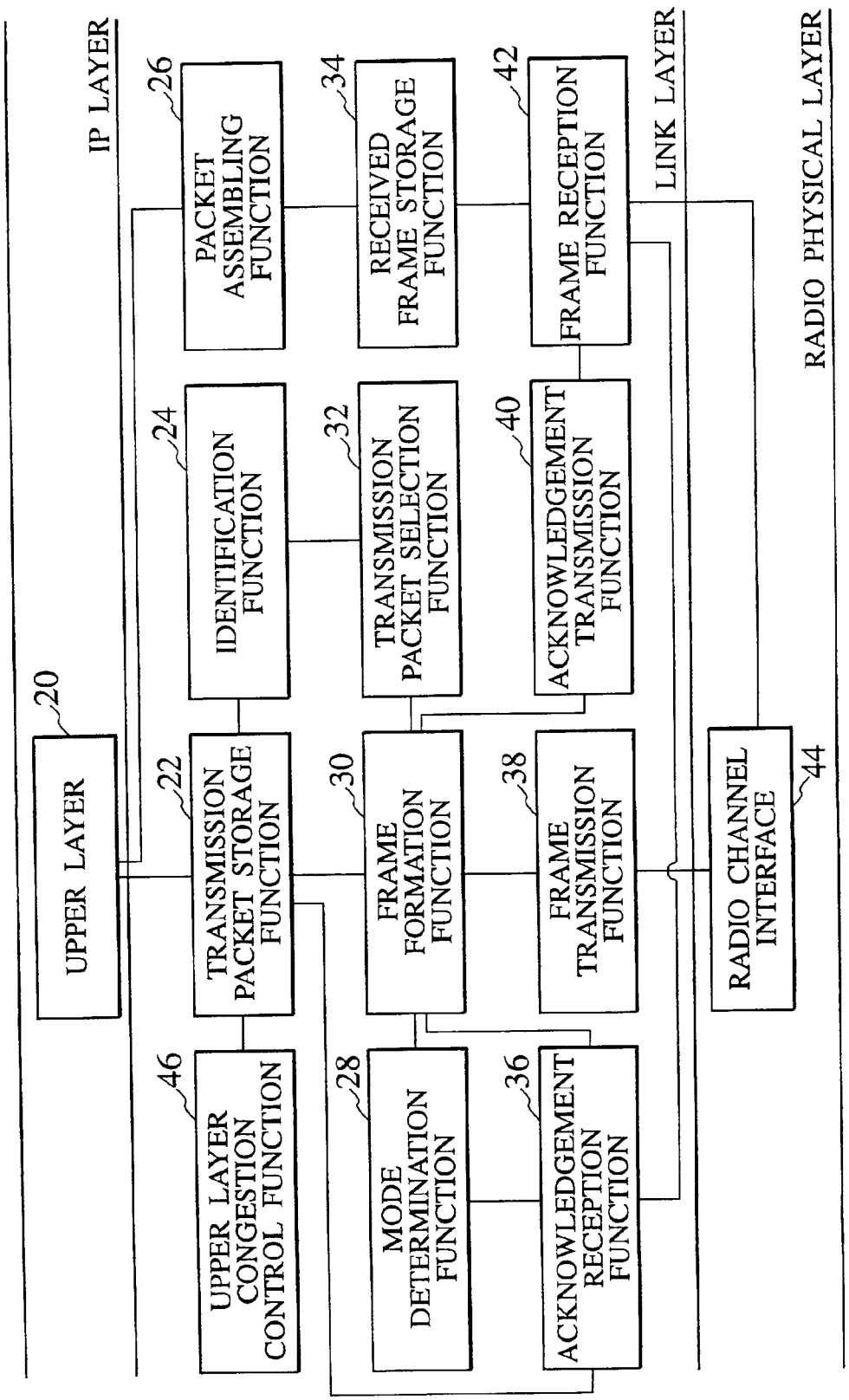
FIG. 4 is a block diagram showing a functional configuration of a link layer in the the communication protocols of FIG. 2 and FIG. 3.

FIG. 4 shows a functional configuration suitable for both the link layer 184 of FIG. 2 and the link layer 122 of FIG. 3. The functional configuration of FIG. 4 comprises an upper layer 20, a transmission packet storage function 22, an identification function 24, a packet assembling function 26, a mode determination function 28, a frame formation function 30, a transmission packet selection function 32, a received frame storage function 34, an acknowledgement reception function 36, a frame transmission function 38, an acknowledgement transmission function 40, a frame reception function 42, a radio channel interface 44, and an upper layer congestion control function 46. The upper layer congestion control function 46 will be described in the second embodiment to be described below.

In FIG. 4, the upper layer 20 corresponds to the IP layer 183 of FIG. 2 and the IP layer 121 of FIG. 3, and the radio channel interface 44 corresponds to the radio physical layer 185 of FIG. 2 and the radio physical layer 123 of FIG. 3. In the following, a function of the link layer 184 of the radio terminal 18 of FIG. 2 will be referred to as "... function(M)" while a function of the link layer 122 of the radio base station 12 of FIG. 3 will be referred to as "... function(B)" according to the needs. For example, the transmission packet storage function 22 of FIG. 4 will be referred to as "transmission packet storage function(M)" if it is a function of the link layer 184 of the radio terminal 18 of FIG. 2, or as "transmission packet storage function(B)" if it is a function of the link layer 122 of the radio terminal 12 of FIG. 3.

Next, with references to FIG. 4, FIG. 5 and FIG. 6, the communication control method according to the first embodiment of the present invention will be described.

Figure 5:
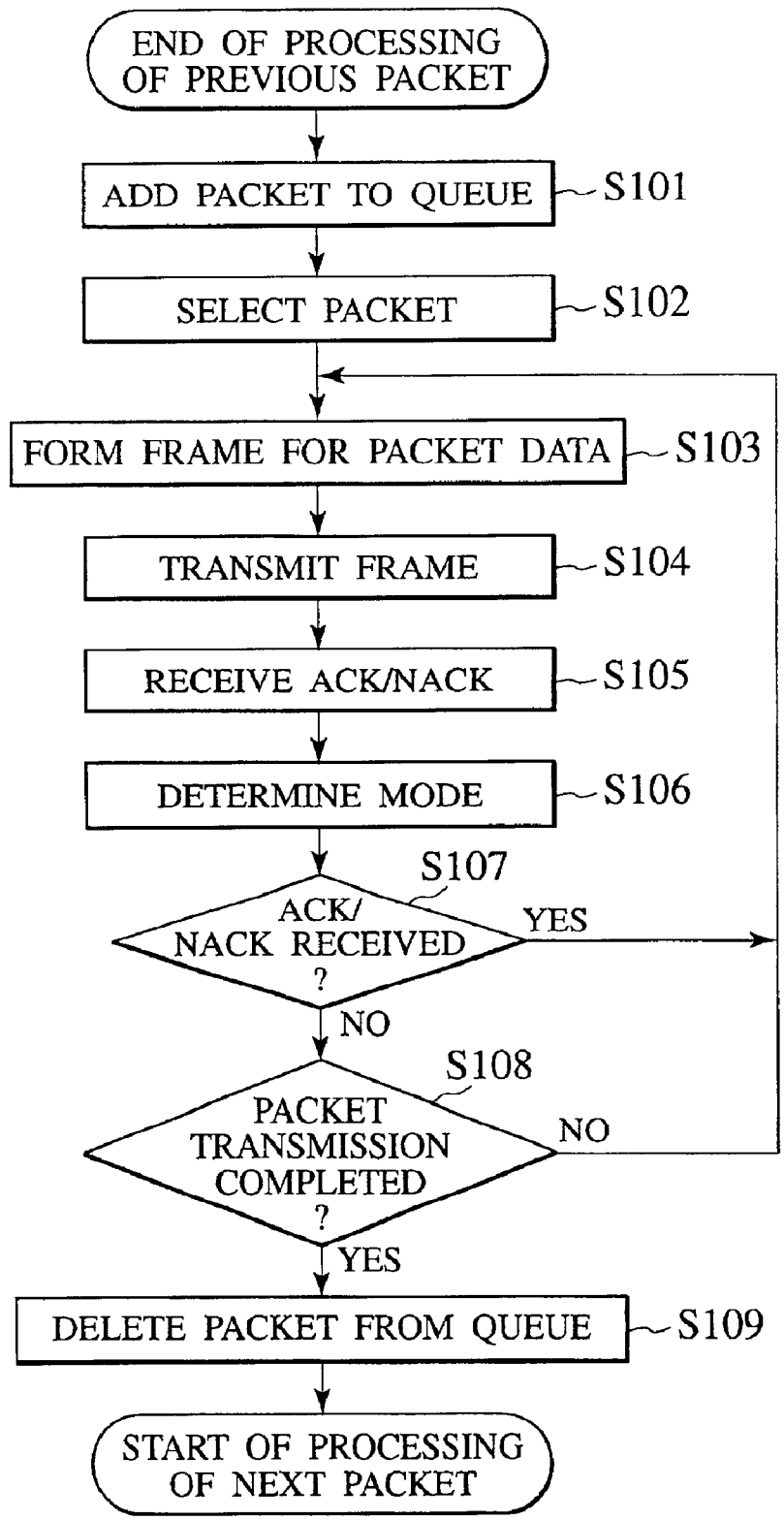
FIG. 5 is a flow chart for a processing procedure of a link layer of a radio base station in the network system of FIG. 1.
Figure 6:
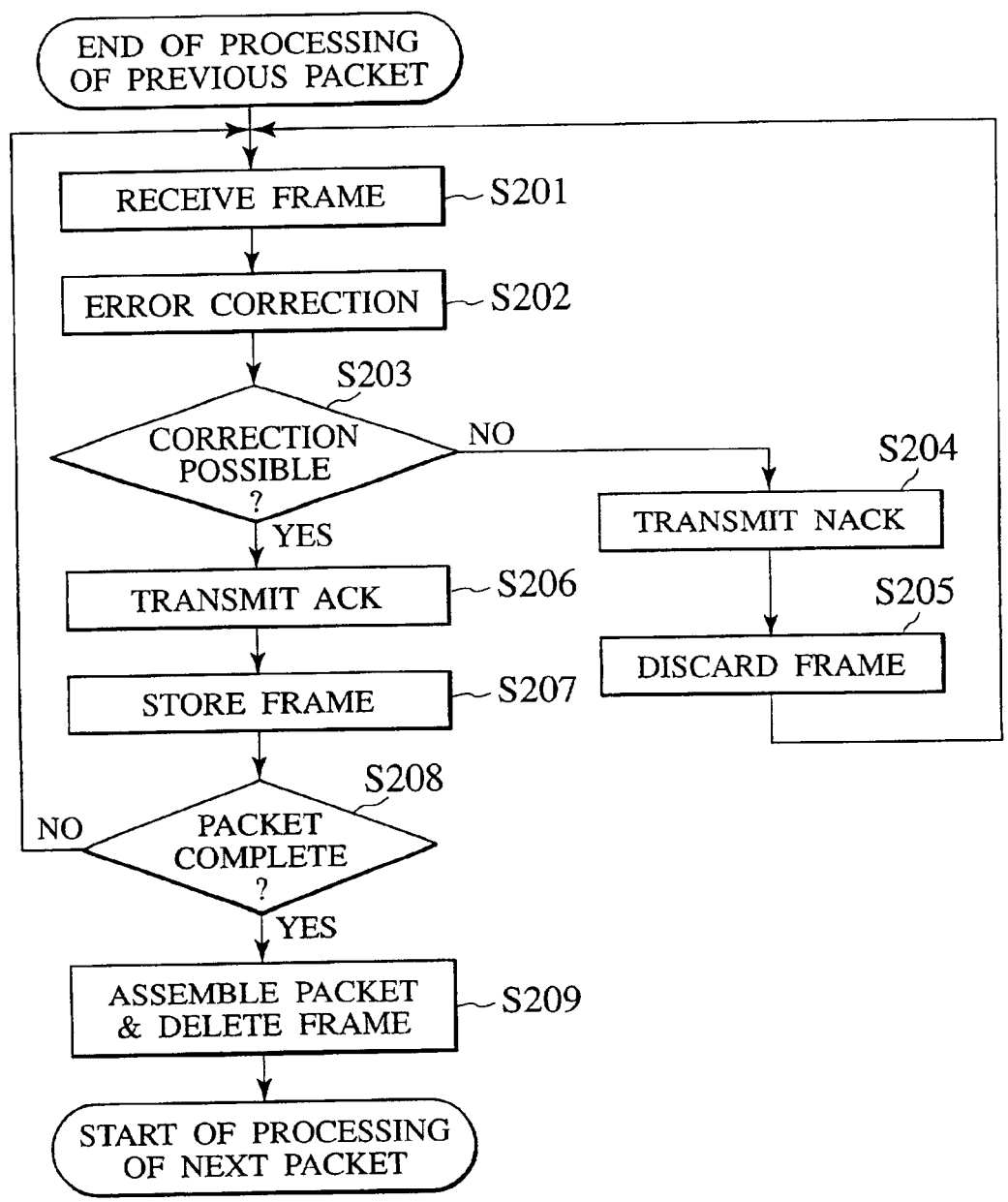
FIG. 6 is a flow chart for a processing procedure of a link layer of a radio terminal in the network system of FIG. 1.

FIG. 5 shows a flow chart for the processing procedure of the link layer 122 of the radio base station 12 of FIG. 3 in the communication control method according to this embodiment, and FIG. 6 shows a flow chart for the processing procedure of the link layer 184 of the radio terminal 18 of FIG. 2 in the communication control method according to this embodiment. As described above, the exemplary case of the data transmission by the TCP from the terminal 10 through the radio base station 12 to the radio terminal 18 will be described here. For this reason, FIG. 5 is the processing procedure of the transmitting side link layer and FIG. 6 is the processing procedure of the receiving side link layer.

In FIG. 5 and FIG. 6, it is assumed that one IP packet is transmitted and received at a time, and the transmission/reception processing for a next IP packet will start after the transmission/reception processing for that IP packet is finished, for the sake of simplicity. This corresponds to the case where the link layer re-transmission algorithm is SW (Stop and Wait). In other words, the transmission/reception processing for a next link layer frame is carried out only after the transmission/reception of one link layer frame is completed, so that the transmission/reception processing is also carried out for one packet at a time unless the link layer frame contains data of a plurality of IP packets (which is assumed to be the case in this first embodiment).

It is to be noted that, when the re-transmission algorithm is GBN (Go Back N) or SR (Selective Repeat), there can be cases where the transmission/reception processings for a plurality of IP packets are to be carried out simultaneously, and the present invention is also applicable to such cases as well.

(A) The link layer 122 of the radio base station 12 (Transmitting side link layer):

(1) After the processing of a previous IP packet, if the upper layer 20 of the transmitting side link layer 122 still has an IP packet to be transmitted, the transmission packet storage function(B) 22 adds that IP packet to the end of the queue (step S101 of FIG. 5). The IP packet is processed by the transmission/reception processing only one at a time, so that at the end of the transmission processing of the previous IP packet, the IP packets set in the queue are all non-transmitted IP packets. Note that in the more general case of carrying out the transmission/reception processings for a plurality of IP packets simultaneously, the order will be such that zero or more of IP packets in process of being transmitted are set at a top of the queue, and one or more non-transmitted IP packets are set after them. Also, "in process of being transmitted" here indicates a state in which at least a part of the data constituting the IP packet is transmitted as the link layer frame at least once but the transmission of the entire data is still not completed.

(2) The transmission packet selection function(B) 32 selects an IP packet to be a candidate for a next transmission from the IP packets set in the queue (step S102 of FIG. 5). Here, if the IP packet is a TCP/IP packet, this IP packet has an IP header shown in FIG. 7 and a TCP header shown in FIG. 8. Then, each TCP connection can be uniquely identified by a set of four information including "Source Address" 48 and "Destination Address" 50 of FIG. 7 and "Source Port" 52 and "Destination Port" 54 of FIG. 8. In the following, the TCP connections will be abbreviated as connection #1, connection #2, etc. At this point, it is assumed that the non-transmitted packets of the TCP connections #1 and #2 are set in the queue in this order. FIG. 9 shows a content of a TCP transmission management table provided in the transmission packet selection function 32 at this point.

The transmission packet selection function(B) 32 checks the TCP connection numbers of the non-transmitted packets in an order starting from a top of the queue. The first non-transmitted packet is that of the TCP connection #1, and it was transmitted before recently according to the TCP transmission management table of FIG. 9. Consequently, the transmission packet selection function(B) 32 does not set this packet of the TCP connection #1 as a next transmission packet candidate.

The next non-transmitted packet is that of the TCP connection #2, which was not transmitted before recently according to the TCP transmission management table of FIG. 9. Consequently, the transmission packet selection function(B) 32 sets this packet of the TCP connection #2 as a next transmission packet candidate. Then, this non-transmitted packet of the TCP connection #2 is inserted at a top of the queue. In other words, the order of the non-transmitted packet of the TCP connection #1 and the non-transmitted packet of the TCP connection #2 within the queue is reversed.

(3) The frame formation function(B) 30 carries out the frame formation for the packet data of the TCP connection #2 (step S103 of FIG. 5). Here, the frame structure of the link layers 122 and 184 will be described. FIG. 10 shows a frame structure of the link layers 122 and 184. In the frame structure of FIG. 10, a "connection number" 56 is for identifying a connection of the link layers 122 and 184. The frame formation function 30 multiplexes all the TCP/IP packets into the same link layer connection.

The frame formation function 30 attaches a "sequence number" 58 of the link layers 122 and 184 to each packet. Note that the sequence number is unnecessary of the re-transmission control of the link layers 122 and 184 is SW. On the other hand, the sequence number is necessary when the re-transmission control of the link layers 122 and 184 is GBN or SR. The frame length is variable depending on modes, so that there can be cases where the data of the same packet are set in different frames in the initial transmission and the subsequent re-transmission. For this reason, the "sequence number" 58 is not a frame number, but a number given in appropriate modulo according to the amount of data (in units of bits or bytes) that have been transmitted before at the link layers 122 and 184.

An "ACK/NACK number" 60 is a sequence number of the received link layer frame which becomes a target of acknowledgement or negative acknowledgement. Then, an "ACK/NACK indication" 62 indicates whether the number indicated by the "ACK/NACK number" 60 is an ACK number or a NACK number. The frame formation function 30 sets values of the "ACK/NACK number" 60 and the "ACK/NACK indication" 62 appropriately according to information obtained from the acknowledgement transmission function 40.

A "mode information" 64 indicates a mode of the link layer frame formation. Here, it is assumed that there are the following two modes: (a) the first mode is a clear mode which will be used when the state of the radio channel 16 is regarded as good. This is a mode in which the error correction is not applied to the payload, i.e., there is no overhead of the payload error correction information; and (b) the second mode is a noisy mode which will be used when the state of the radio channel 16 is regarded as bad. This is a mode in which the error correction is applied to the payload, i.e., a redundancy of the payload error correction information is added. The frame formation function 30 sets a value of the "mode information" 64 according to information obtained from the mode determination function 28.

A payload data length" 68 indicates a length of the data stored in the "payload" of this frame. This is the net data length which does not include a length of the "payload error correction information".

A "header error correction information" 70 is a redundancy information given for the purpose of protecting a "link layer header" 72 from channel errors.

Figure 11:
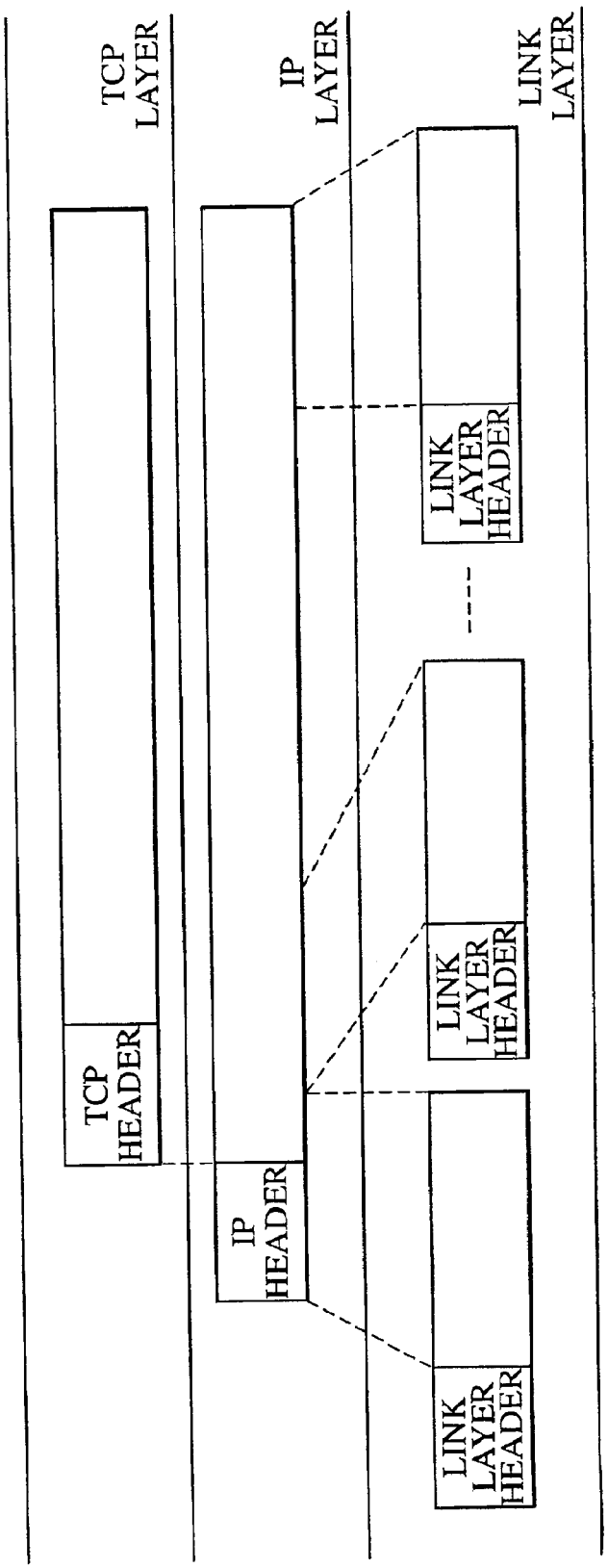
FIG. 11 is a diagram showing a relationship between an TCP/IP packet and link layer frames that can be used in the network system of FIG. 1.

FIG. 11 shows a relationship between the link layer frame and the TCP/IP packet. As shown in FIG. 11, in general, one TCP/IP packet is divided into a plurality of link layer frames. Here, the target of the frame formation is the non-transmitted packet of the TCP connection #2 at a top of the queue. The frame formation function 30 forms a "link layer payload" 74 by adding the "payload error correction information" according to the mode at that point to a part of the data for this packet. Here, the mode set in the "mode information" 64 is assumed to be the clear mode.

Note that, in the general case of carrying out the transmission/reception processings for a plurality of packets in parallel, the packet selected at the step S102 of FIG. 5 may not necessarily be the target of the frame formation. There are case where data of the packet in process of being transmitted is set as the target of the frame formation.

(4) The frame transmission function(B) 38 commands the radio channel interface(B) 44 to transmit the frame so formed. At the same time, the frame transmission function (B) 38 marks the TCP connection #2 as one that was transmitted before recently in the TCP transmission management table as shown in FIG. 12. The radio channel interface(B) 44 transmits the frame so formed (which will be referred to as frame A) by using the radio channel 16 (step S104 of FIG. 5).

At this point, a transition from the processing of the link layer 122 of the radio base station 12 (transmitting side link layer) shown in FIG. 5 to the processing of the link layer 184 of the radio terminal 18 (receiving side link layer) shown in FIG. 6 is made.

(B) The link layer 184 of the radio terminal 18 (Receiving side link layer):

(5) The radio channel interface(M) 44 gives the frame A received from the radio channel 16 to the frame reception function 42 (step S201 of FIG. 6).

(6) The frame reception function(M) 42 first corrects errors of the "link layer header" 72 by utilizing the "header error correction information" 70 of the frame A if necessary, so as to put it in a state in which the header information can be read. In the following, it is assumed that the correct error correction is always possible as the header information is sufficiently protected against most radio errors. The error correction method for the "payload data" is determined according to the "mode information" 64, and the "payload data" are recovered by utilizing the determined error correction method and the "payload error correction information" 70 (step S202 of FIG. 6).

(7) Suppose now that the mode is the clear mode and the radio error occurred so that the payload could not be recovered correctly as the error correction could not be carried out. Here however it is assumed that the error detection is always possible. Then, this frame A is a frame for which the correction is impossible (step S203 NO in FIG. 6), the acknowledgement transmission function(M) 40 commands the frame formation function(M) 30 to transmit by inserting NACK (negative acknowledgement) into the frame header.

In NACK to be produced by the frame formation function (M) 30, a "link layer frame 76" of FIG. 10 may comprises only a "link layer header" 72. However, if there is data to be transmitted, NACK will be piggybacked by that data, so that a "link layer payload" 74 is also attached. The "connection number" 56 of NACK is set equal to the "connection number" 56 of the frame A for which the correction is impossible. Also, the "sequence number" 58 of the frame A is given to the "ACK/NACK number" 60, and a value indicating NACK is given to the "ACK/NACK indication" 62. To an "error information" 66, a value indicating a level of the error such as the number of corrected bits is set if it is a correction possible one, but a value indicating a correction impossible one is set here as it is a correction impossible one. To the other fields of the "link layer header" 72, values appropriate for the content of the "link layer payload" 74 are given and the "header error correction information" 70 is added. A "payload" is also attached if necessary.

This NACK frame (which will be referred to as frame B) is transmitted by the radio channel interface(M) 44 (step S204 of FIG. 6). Then, the received frame A for which the correction is impossible is discarded (step S205 of FIG. 6).

At this point, a transition from the processing of the link layer 184 of the radio terminal 18 (receiving side link layer) shown in FIG. 6 to the processing of the link layer 122 of the radio base station 12 (transmitting side link layer) shown in FIG. 5 is made.

(C) The link layer 122 of the radio base station 12 (Transmitting side link layer):

(8) The NACK frame B is received by the frame reception function(B) 42 of the radio base station 12, and the information regarding NACK is given to the acknowledgement reception function(B) 36 (step S105 of FIG. 5). The acknowledgement reception function(B) 36 commands the mode determination function(B) 28 to determine the mode. The mode determination function(B) 28 determine the mode as the clear mode when the value of the "error information" 66 indicates that the error correction was unnecessary, or as the noisy mode when the value of the "error information" 66 indicates that the error correction was necessary or the error correction was impossible. Consequently, the mode is changed from the clear mode to the noisy mode here (step S106 of FIG. 5).

(9) As NACK is received (step S107 YES in FIG. 5), the frame A for which the correction was impossible is re-transmitted. The frame formation for the packet data is carried out by the procedure similar to that described above (step S103 of FIG. 5). Here, however, instead of the frame formation in the clear mode that was carried out previously, the frame formation in the noisy mode is carried out this time. In order to raise the error tolerance, it is preferable to set the "payload data length" shorter than that in the clear mode. Consequently, borders for dividing the packet into frames will be changed. In addition, the "payload error correction information" of FIG. 10 is also attached. The frame A' so formed is then transmitted similarly as described above (step S104 of FIG. 5).

At this point, a transition from the processing of the link layer 122 of the radio base station 12 (transmitting side link layer) shown in FIG. 5 to the processing of the link layer 184 of the radio terminal 18 (receiving side link layer) shown in FIG. 6 is made again again.

(D) The link layer 184 of the radio terminal 18 (Receiving side link layer):

(10) The radio terminal 18 receives the re-transmitted frame A' similarly as described above (step S201 of FIG. 6), and the frame reception function(M) 42 of the radio terminal 18 carries out the error correction (step S202 of FIG. 6). It is assumed that the error correction is possible this time (step S203 YES in FIG. 6).

(11) The acknowledgement transmission function(M) 40 commands the frame formation function(M) 30 to transmit by inserting ACK (acknowledgement) into the frame header.

In ACK to be produced by the frame formation function (M) 30, a "link layer frame 76" of FIG. 10 may comprises only a "link layer header" 72 or may be piggybacked. The "connection number" 56 of ACK is set equal to the "connection number" 56 of the received frame A'. Also, the "sequence number" 58 of the received frame A' is given to the "ACK/NACK number" 60, and a value indicating ACK is given to the "ACK/NACK indication" 62. To an "error information" 66, a value indicating the number of corrected bits is set. To the other fields of the "link layer header" 72, values appropriate for the content of the "link layer payload" 74 are given and the "header error correction information" 70 is added. A "payload" is also attached if necessary.

This ACK frame (which will be referred to as frame B') is transmitted by the radio channel interface(M) 44 (step S206 of FIG. 6). Then, the received frame A' is stored (step S207 of FIG. 6). Here, it is assumed that the original packet cannot be completed by the frame A' alone (step S208 NO in FIG. 6).

At this point, a transition from the processing of the link layer 184 of the radio terminal 18 (receiving side link layer) shown in FIG. 6 to the processing of the link layer 122 of the radio base station 12 (transmitting side link layer) shown in FIG. 5 is made again.

(E) The link layer 122 of the radio base station 12 (Transmitting side link layer):

(12) The ACK frame B' is received by the frame reception function(B) 42 of the radio base station 12, and the information regarding ACK is given to the acknowledgement reception function(B) 36 (step S105 of FIG. 5).

(13) The acknowledgement reception function(B) 36 commands the mode determination function(B) 28 to determine the mode. The mode determination function(B) 28 determine the mode as the noisy mode when the value of the "error information" 66 of the ACK frame B' indicates that the error correction was necessary. Consequently, the mode is unchanged here (step S106 of FIG. 5).

(14) As ACK is received (step S107 YES in FIG. 5), the frame is formed for new data and transmitted. The frame formation method is similar to that described above (step S103 of FIG. 5). The frame so formed is then transmitted similarly as described above (step S104 of FIG. 5).

(15) The frame exchange by the above described (1) to (14) is repeated between the radio base station 12 and the radio terminal 18. Then, it is assumed that one packet is completed by the received frame at the radio terminal 18 which is the receiving side (step S208 YES in FIG. 6). The packet assembling function(M) 26 of the radio terminal 18 assembles the packet from the frames received and stored up to this point, and gives the completed packet to the upper layer 20. In addition, the frames constituting this packet are deleted from the received frame storage function(M) 34 (step S209 of FIG. 6).

(16) When the radio base station 12 receives ACK for the frame that completed the packet, the acknowledgement reception function(B) 36 commands the transmission packet storage function(B) 22 to delete the packet for which the transmission is completed (step S109 of FIG. 5), in addition to the procedure similar to that described above. This completes the transmission/reception processing for the TCP/IP packet of the TCP connection #2.

(17) The transmission packet storage function(B) 22 of the radio base station 12 tries to add a next packet to the queue, and here suppose that the transmission of a new packet is not requested by the upper layer 20 (step S101 of FIG. 5). In this case, the transmission packet selection function(B) 32 selects a candidate for a packet to be transmitted next in a state where only the TCP/IP packets of the TCP connection #1 are present. The TCP transmission management table shown in FIG. 12 indicates that the packet of the TCP connection #1 was transmitted before recently, and there is no TCP/IP packet of the TCP connection which was not transmitted before recently, so that a next transmission candidate cannot be selected. In this case, the transmission packet selection function(B) 32 resets the TCP transmission management table into a state shown in FIG. 13. Then, the TCP/IP packet of the TCP connection #1 as a next transmission candidate.

On the other hand, suppose that the transmission of TCP/IP packets of the TCP connections #2 and #3 is newly requested by the upper layer 20. Then, they are added to the queue by the transmission packet storage function(B) 22 (step S101 of FIG. 5). Here, the TCP/IP packet of the TCP connection #2 was transmitted before recently as described above, so that the transmission packet selection function(b) 32 selects the TCP/IP packet of the TCP connection #3 as a next transmission candidate, and moves it to the top of the queue.

As described above, according to the first embodiment of the present invention, it is possible to reduce a possibility for forming and transmitting frames for the packets belonging to the same TCP connection consecutively compared with the case of operating the packet storage queue as a simple FIFO (First In First Out).

In particular, this first embodiment of the present invention is effective in the case where the queue length becomes long. Namely, when the re-transmission due to radio errors occurs or when the redundancy given by the payload error correction information is increased in order to protect data from radio errors, the effective bandwidth of the radio channel 16 is temporarily decreased such that the radio channel 16 becomes a bottleneck, and the queue length becomes long. In such cases, the RTT appears to be increased abruptly from a viewpoint of the terminal 10 which is the TCP transmission terminal, so that it becomes easier for the time-out re-transmission of the TCP to occur.

The first embodiment of the present invention is capable of circumventing a tendency for continually occupying the radio channel 16 for a single or a small number of TCP connection data transmissions such that ACKs of the other TCP connections cannot be returned for a long period of time. As a result, it is possible to suppress the increase of the RTTs of the TCP connections and enable the TCP connections to utilize the radio channel 16 evenly. For this reason, it is possible to reduce or eliminate the number of TCP connections for which the time-out re-transmission of the TCP occurs.

Thus according to the first embodiment, the packet transmission order can be determined such that the packets belonging to the same TCP connection will not be transmitted consecutively as much as possible. Consequently, it becomes possible to suppress the increase of the RTT observed by the TCP transmission terminal of each TCP connection to the minimum and to control the unnecessary time-out re-transmission of the TCP, even in the case where the radio channel state becomes poor, the effective bandwidth of the channel is decreased, and the transmission delay is increased abruptly. As a result, it becomes possible to utilize the radio channel bandwidth efficiently.

Note that the first embodiment of the present invention is also applicable to the network system configuration other than that of FIG. 1.

Figure 14:
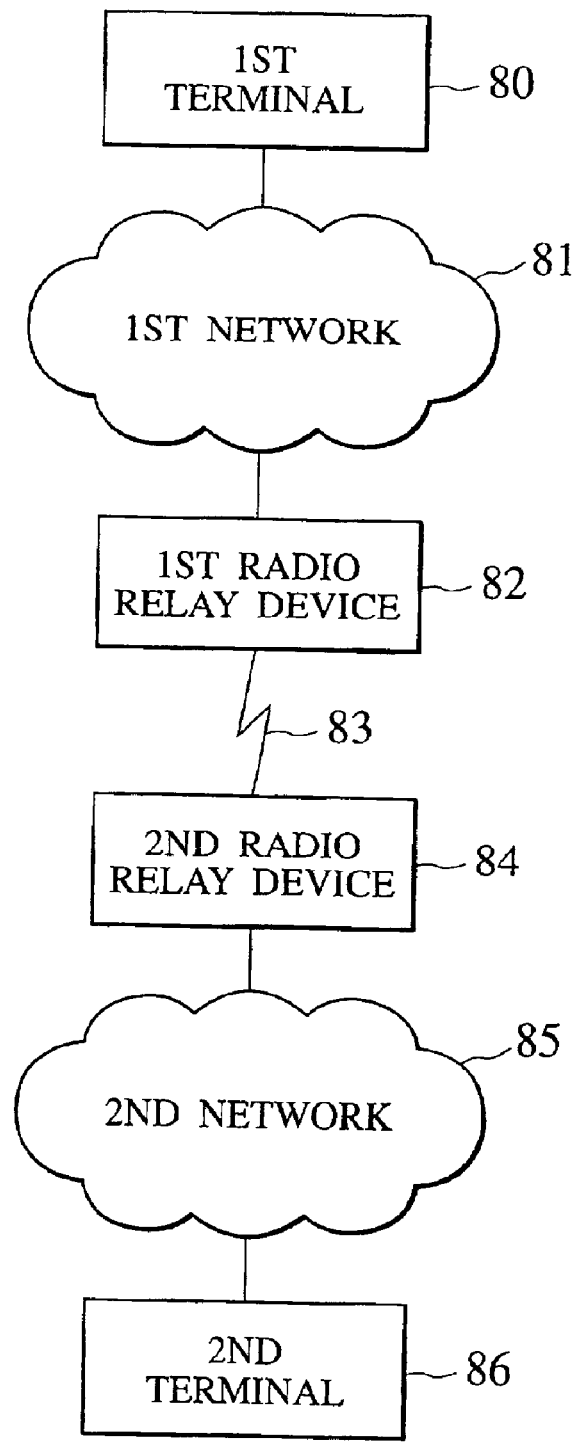
FIG. 14 is a schematic block diagram showing another exemplary configuration of a network system using a communication device according to the first embodiment of the present invention.

FIG. 14 shows another exemplary configuration of a network system according to the first embodiment of the present invention. In the network system of FIG. 14, a first terminal 80 and a second terminal 86 exchange IP packets through a first network 81, a first radio relay device 82, a second radio relay device 84, and a second network 85. Here, each of the first network 81 and the second network 85 has an IP packet delivery function. The protocol configuration of the first and second radio relay devices 82 and 84 having an IP packet routing function (IP router function) is similar to the protocol configuration of the radio base station 12 shown in FIG. 3. Also, the link layer function configuration is similar to that shown in FIG. 4.

Figure 15:
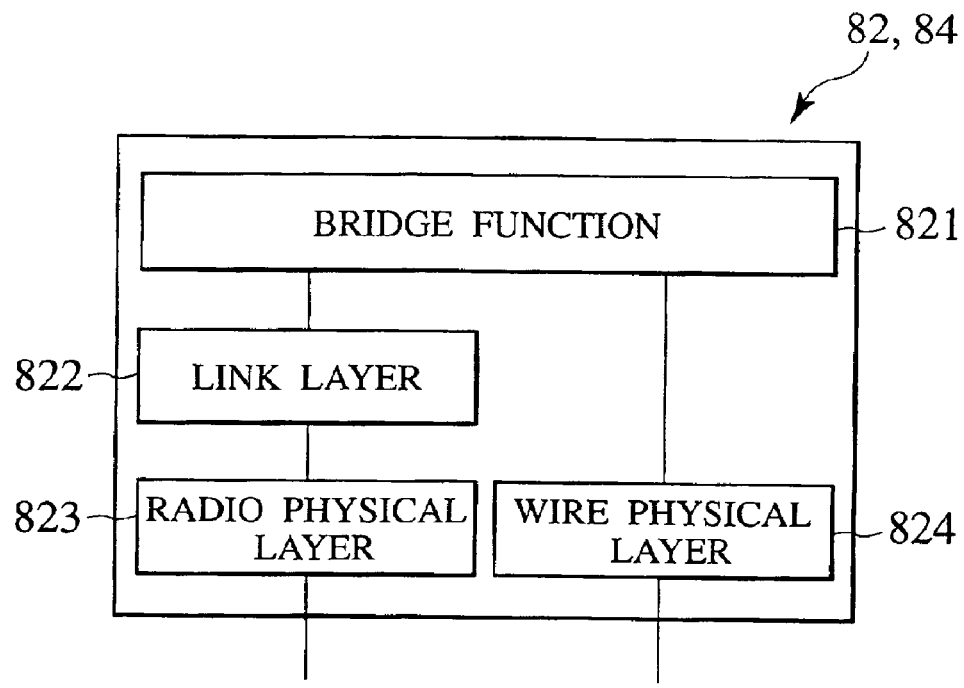
FIG. 15 is a block diagram showing a configuration of a communication protocol used in a radio relay device in the network system of FIG. 14.

FIG. 15 shows a protocol configuration of each of the first and second radio relay devices 82 and 84 in the case where it functions as a bridge. Here, in contrast to the IP layer 121 of FIG. 3 which carries out the IP packet routing according to information of an IP address and an IP routing table, a bridge function 821 of FIG. 15 simply relays a frame received from one side to the other side. Note however that there are cases where the bridge function 821 also has a function for distinguishing frames that should be relayed and frames that should not be relayed acccording to the link layer address or the MAC address and discard the frames that should not be relayed. The link layer 822 of FIG. 15 has a functional configuration similar to that of FIG. 4, except that the upper layer 20 of FIG. 4 should be replaced by the bridge function 821.

In the network of such a configuration, the data transmission by the TCP from the first terminal 80 to the second terminal 86 can be carried out. In this case, the link layer operation can be realized in such a manner that the first radio relay device 82 side carries out the processing procedure of the transmitting side shown in FIG. 5 while the second radio relay device 84 side carries out the processing procedure of the receiving side shown in FIG. 6.

Figure 16:
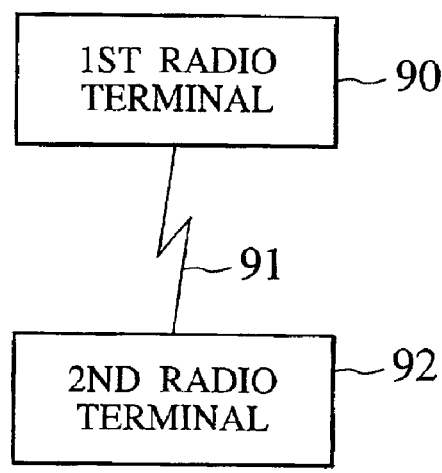
FIG. 16 is a schematic block diagram showing another exemplary configuration of a network system using a communication device according to the first embodiment of the present invention.

FIG. 16 shows still another exemplary configuration of the network system according to the first embodiment of the present invention. In the network system of FIG. 16, a first radio terminal 90 and a second radio terminal 92 are directly connected through a radio channel 91, and the first radio terminal 90 and the second radio terminal 92 exchange IP packets through the radio channel 91. The protocol configuration of the first and second radio terminals 90 and 92 is similar to that of the radio terminal 10 shown in FIG. 2. Also, the link layer function configuration is similar to that shown in FIG. 4.

In the network of such a configuration, the data transmission by the TCP from the first radio terminal 90 to the second radio terminal 92 can be carried out. In this case, the link layer operation can be realized in such a manner that the first radio terminal 90 side carries out the processing procedure of the transmitting side shown in FIG. 5 while the second radio terminal 92 side carries out the processing procedure of the receiving side shown in FIG. 6.

Note also that the above description is directed to the exemplary case where the unstable channel is the radio channel, but the present invention is not limited to this particular case. Namely, the application of the present invention is also effective even in the case of the wire channel when the effective bandwidth of the channel varies due to the adaptive error compensation of layers (including a physical layer) below the link layer according to the channel quality.

Next, the second embodiment of a communication device and a communication control method according to the present invention will be described in detail.

In the first embodiment described above, when the re-transmission occurs or the redundancy of the error correction information is increased in order to protect data from radio errors at the link layer, a kind of congestion will occur. On the other hand, the TCP transmission terminal will interpret the packet loss as an indication of the congestion and carry out the congestion control by reducing the amount of data that can be transmitted to the network by reducing a window size.

However, the congestion control of the TCP does not function effectively with respect to this congestion because the link layer protects data from radio errors such that the packet will not be lost. The window size of the TCP will be kept increasing so that there is a problem that the transmission delay becomes very large even if the packet queue size is sufficiently large to prevent the queue overflow.

In the second embodiment of the present invention, the link layer 184 of FIG. 2 and the link layer 122 of FIG. 3 is further provided with the upper layer congestion control function 46 for enabling the congestion control of the TCP to function effectively by marking upper layer packets (IP packets) or discarding IP packets selectively according to a prescribed rule. This upper layer congestion control function 46 corresponds to the so called Active Queue Management function for detecting the initial stage congestion, a representative example of which is RED (Random Early Detection). Note however that this is realized as a function of the link layer in the second embodiment, rather than a general practice of realizing this as a function of the IP layer.

Figure 7:
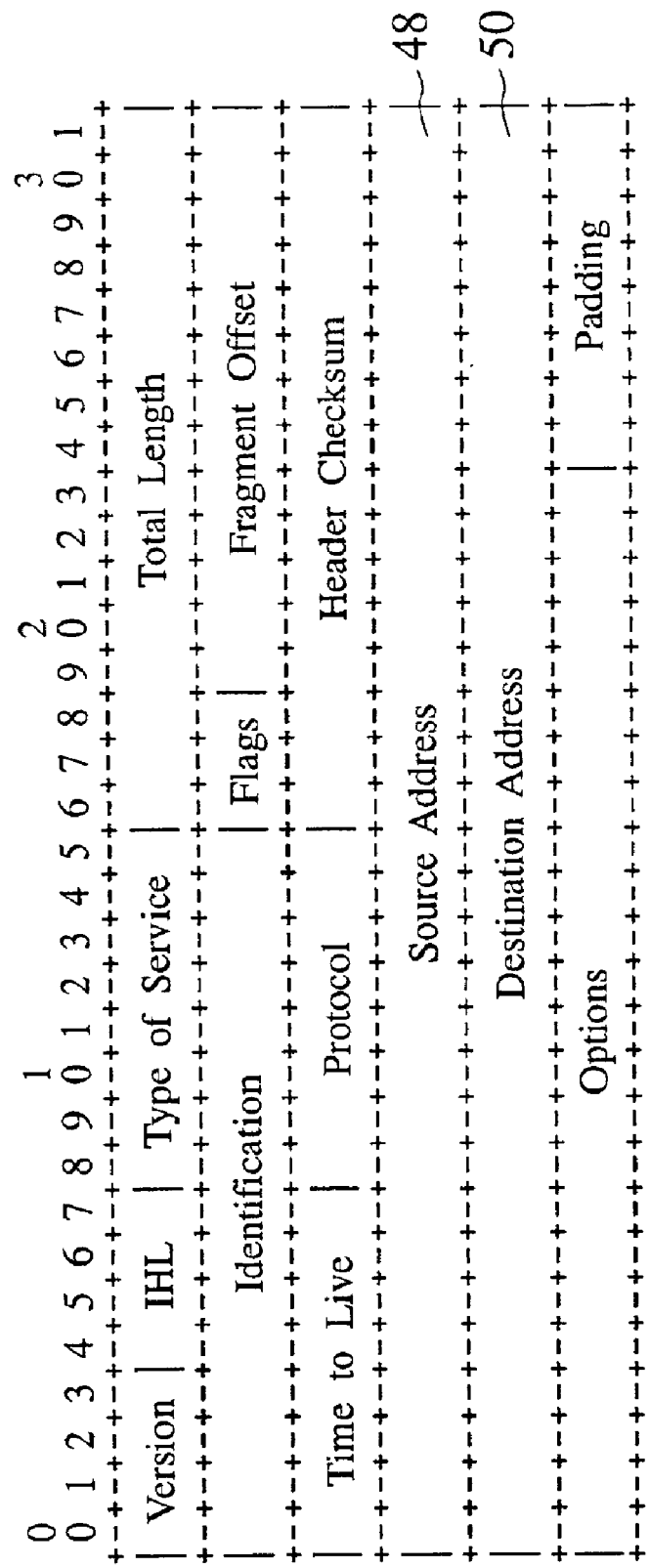
FIG. 7 is a diagram showing a content of an IP header attached to a general TCP/IP packet that can be used in the network system of FIG. 1.
Figure 8:
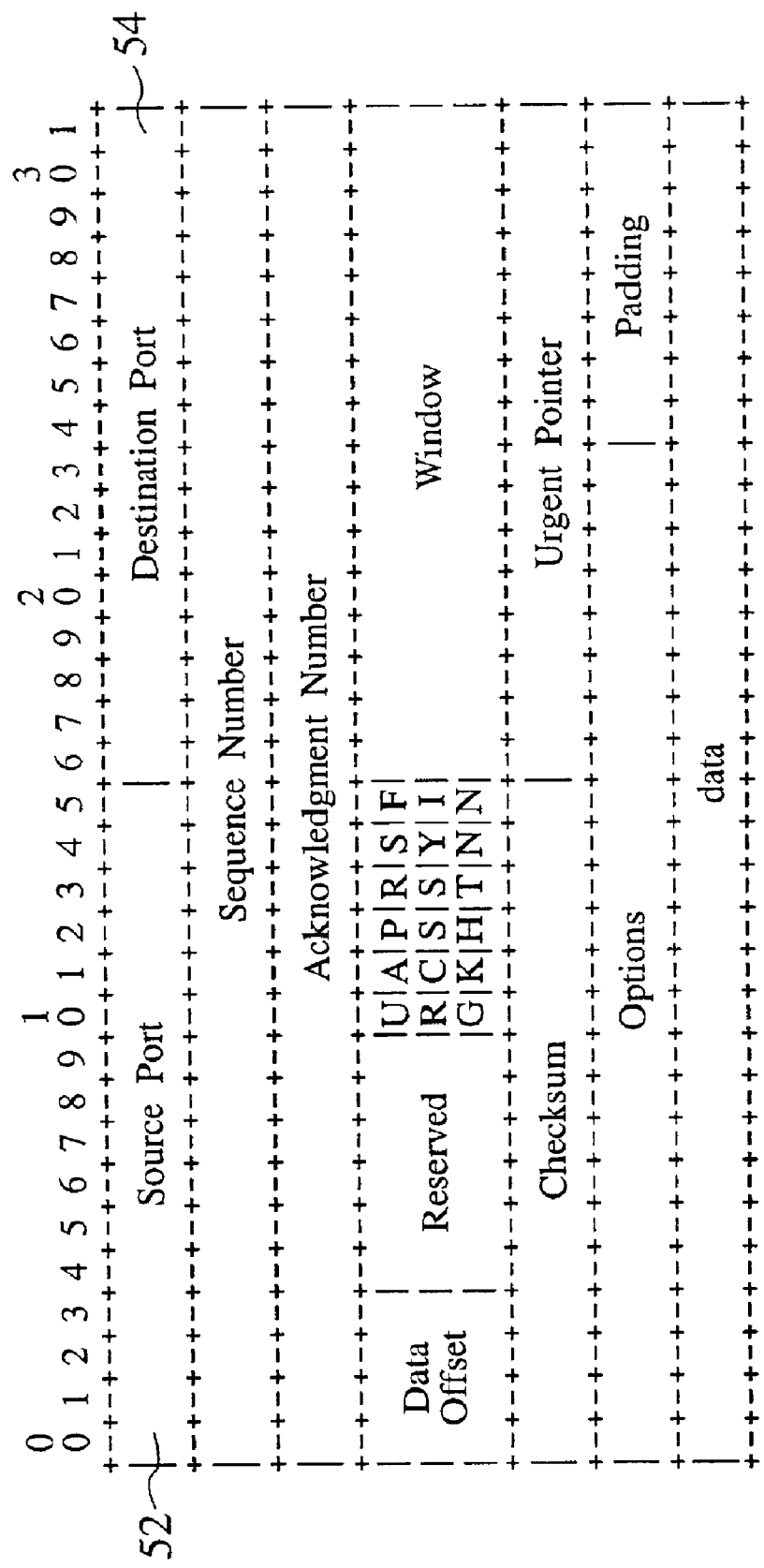
FIG. 8 is a diagram showing a content of an TCP header attached to a general TCP/IP packet that can be used in the network system of FIG. 1.

Here, in the case of discarding the IP packets according to an appropriate rule, the widely used TCP/IP implementation can be utilized directly. On the other hand, in the case of marking the IP packets, the following TCP/IP specification will be used. Namely, a part of TOS (Type Of Service) field in the IP header of FIG. 7 is allocated to ECN (Explicit Congestion Notification). The sixth bit of TOS is set as an ECT (ECN-Capable Transport) bit, and the seventh bit of TOS is set as a CE (Congestion Experienced) bit. Also, the ninth bit of a Reserved field in the TCP header of FIG. 8 is set as an ECN-Echo bit, and the eighth bit of the Reserved field is set as a CWR (Congestion Window Reduced) bit (IETF RFC2481).

The upper layer congestion control function 46 of the second embodiment checks the queue length of the transmission packet storage function 22, and calculates a low-pass filtered average queue length. When the average queue length exceeds a threshold and a random number value exceeds another threshold, (1) the CE flag of the TCP/IP packet is set to "1" if the ECT flag is "1", or (2) the TCP/IP packet is discarded if the ECT flag is "0". Here, the TCP/IP packet with the CE flag set to "1" in the case (1) or the TCP/IP packet to be discarded in the case (2) can be selected from the non-transmitted packets such that the re-transmission control at the link layer or the like is unaffected and the implementation becomes relatively easier.

Then, in the case (2) where the ECT bit is "0", the TCP transmission terminal detects the TCP/IP packet loss, and carries out the congestion control using the ordinary method. On the other hand, in the case (1) where the ECT bit is "1", it implies that both the TCP transmission terminal and the TCP reception terminal have the TCP layer that can handle ECN. In this case, when the TCP reception terminal receives the TCP/IP packet with the CE bit set to "1", the ECN-Echo bit is set to "1" in all the TCP ACKs until the TCP/IP packet with the CWR bit set to "1" is received from the TCP transmission terminal. When the TCP transmission terminal receives the TCP ACK with the ECN-Echo bit set to "1", the window size is reduced by carrying out the congestion control as if the packet loss is detected. The frequency for reacting to the congestion is limited to be at most once during one RTT period.

As described above, according to the second embodiment of the present invention, the occurrence of the unnecessary congestion control of the TCP is also suppressed so that it becomes possible to use the entire bandwidth quickly when the radio channel state becomes good and the effective bandwidth of the channel is recovered. Also, there is no need to change the implementation of the existing TCP for the purpose of achieving these effects, and it can be implemented easily in the existing TCP.

Thus according to the present invention, it is possible to realize the communication device and the communication control method for the case of carrying out communications using a communication protocol with data loss compensation functions provided at both upper and lower layers, which are capable of suppressing the wasteful execution of the data loss compensation function at the upper layer even when the transmission delay is increased by the data loss compensation function at the lower layer.

According to the present invention, the packets are stored in the transmission packet storage function in the order of transmission requests, and their transmission order can be changed such that the packets belonging to the same connection will not be transmitted consecutively as much as possible. Namely, it is possible to sequentially transmit the packets belonging to different connections. Consequently, the wasteful execution of data loss compensation function at the upper layer such as the time-out re-transmission can be suppressed.

In other words, a transmission order of the stored packets is controlled at the lower layer, according to the managed transmission state, such that a level of continuity of packets belonging to each upper layer connection in the transmission order becomes not higher than a level of continuity of packets belonging to each upper layer connection in a storing order by which the stored packets are stored. Then, the data loss compensation function provided at the lower layer can be dynamically adapted to a level of data loss. In addition, a start of a congestion control at the upper layer can be controlled according to an amount of the stored packets, by marking or discarding upper layer packets selectively.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the terminal or the relay device of each of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A communication device using a communication protocol with data loss compensation functions provided at both an upper layer and a lower layer, comprising:
    a packet storage unit configured to store a plurality of packets to be transmitted to another communication device;
    a connection identification unit configured to identify an upper layer connection to which each packet stored by the packet storage unit belongs;
    a transmission state management unit configured to manage a transmission state of each upper layer connection identified by the connection identification unit;
    a packet transmission unit configured to transmit each packet stored by the packet storage unit; and
    a packet transmission order control unit configured to control a transmission order among the plurality of packets to be transmitted by the packet transmission unit at the lower layer, according to the transmission state managed by the transmission state management unit, such that when the packet storage unit stores at least one non-transmitted packet for each one of at least two different upper layer connections, at least two packets to be transmitted by the packet transmission unit consecutively are belonging to different upper layer connections.

2. The communication device of claim 1, wherein the upper layer is a transport layer and the lower layer is a link layer.

3. The communication device of claim 1, wherein the packet transmission unit transmits the plurality of packets through an unstable channel in which an effective bandwidth varies.

4. The communication device of claim 3, wherein the packet transmission order control unit controls the transmission order such that the unstable channel is utilized by a plurality of upper layer connections evenly.

5. The communication device of claim 1, wherein the transmission state management unit manages the transmission state that indicates whether a packet belonging to each upper layer connection has been transmitted before or not, with respect to each upper layer connection.

6. The communication device of claim 5, wherein the packet transmission order control unit resets the transmission state of each upper layer connection managed in the transmission state management unit when the packet storage unit stores at least one non-transmitted packet for each one of at least two different upper layer connections and there is no upper layer connection whose packets have not been transmitted before among upper layer connections identified by the connection identification unit, at a time of selecting a next transmission packet.

7. The communication device of claim 5, wherein the packet transmission order control unit selects a packet belonging to an upper layer connection whose packets have not been transmitted before according to the transmission state managed by the transmission state management unit, as a next transmission packet.

8. The communication device of claim 1, further comprising:
    an upper layer congestion control unit configured to control a start of a congestion control at the upper layer according to an amount of packets stored in the packet storage unit.

9. The communication device of claim 1, wherein the communication device is a communication terminal device which further comprises:
    an interface connected to the another communication device, through which packets are transmitted/received to/from the another communication device.

10. The communication device of claim 1, wherein the communication device is a communication relay device which further comprises:
    a first interface connected to a prescribed network;
    a second interface connected to the another communication device; and
    a relay unit configured to receive packets from a terminal on the network through the first interface and transmit received packets to the another communication device through the second interface.

11. A communication control method for controlling a communication device using a communication protocol with data loss compensation functions provided at both an upper layer and a lower layer, the method comprising:
    storing a plurality of packets to be transmitted to another communication device;
    identifying an upper layer connection to which each packet stored by the storing step belongs;
    managing a transmission state of each upper layer connection identified by the identifying step;
    transmitting each packet stored by the storing step; and
    controlling a transmission order among the plurality of packets to be transmitted by the transmitting step at the lower layer, according to the transmission state managed by the managing step, such that when the storing step stores at least one non-transmitted packet for each one of at least two different upper layer connections, at least two packets to be transmitted by the transmitting step consecutively are belonging to different upper layer connections.

12. A computer usable medium having computer readable program codes embodied therein for causing a computer to function as a communication device using a communication protocol with data loss compensation functions provided at both an upper layer and a lower layer, the computer readable program codes include:

a first computer readable program code for causing said computer to store a plurality of packets to be transmitted to another communication device;

a second computer readable program code for causing said computer to identify an upper layer connection to which each packet stored by the first computer readable program code belongs;

a third computer readable program code for causing said computer to manage a transmission state of each upper layer connection identified by the second computer readable program code;

a fourth computer readable program code for causing said computer to transmit each packet stored by the first computer readable program code; and a fifth computer readable program code for causing said computer to control a transmission order among the plurality of packets to be transmitted by the fourth computer readable program code at the lower layer, according to the transmission state managed by the third computer readable program code, such that when the first computer readable program code stores at least one non-transmitted packet for each one of at least two different upper layer connections, at least two packets to be transmitted by the fourth computer readable program code consecutively are belonging to different upper layer connections.

13. A communication device using a communication protocol with data loss compensation functions provided at both an upper layer and a lower layer, comprising:

a packet storage unit configured to store a plurality of packets to be transmitted to another communication device;

a connection identification unit configured to identify an upper layer connection to which each packet stored by the packet storage unit belongs;

a transmission state management unit configured to manage a transmission state of each upper layer connection identified by the connection identification unit;

a packet transmission unit configured to transmit each packet stored by the packet storage unit; and a packet transmission order control unit configured to control a transmission order of the plurality of packets stored in the packet storage unit, at the lower layer, according to the transmission state managed by the transmission state management unit, such that a level of continuity of packets belonging to each upper layer connection in the transmission order becomes not higher than a level of continuity of packets belonging to each upper layer connection in a storing order by which the plurality of packets are stored in the packet storage unit.

14. The communication device of claim 13, wherein the data loss compensation function provided at the lower layer is dynamically adapted to a level of data loss.

15. The communication device of claim 13, further comprising:

an upper layer congestion control unit configured to control a start of a congestion control at the upper layer according to an amount of packets stored in the packet storage unit, by marking or discarding upper layer packets selectively.

* * * * *